US008954931B2

(12) United States Patent
Wefers et al.

(10) Patent No.: US 8,954,931 B2
(45) Date of Patent: Feb. 10, 2015

(54) SYSTEM TEST SCOPE AND PLAN OPTIMIZATION

(75) Inventors: Marcus Wefers, Heidelberg (DE); Reinhold Konnerth, Dielheim (DE); Thierry Lieu, Grasse (FR); Abdelhak Nezzari, Cannes la Bocca (FR); Michael Schaffrath, Leipzig (DE); Torsten Kamenz, Wiesloch (DE); Andreas Kemmler, Boennigheim (DE)

(73) Assignee: SAP SE, Walldorf (DE)

( * ) Notice: Subject to any disclaimer, the term of this patent is extended or adjusted under 35 U.S.C. 154(b) by 113 days.

(21) Appl. No.: 13/566,149

(22) Filed: Aug. 3, 2012

(65) Prior Publication Data

US 2014/0040867 A1 Feb. 6, 2014

(51) Int. Cl.
*G06F 9/45* (2006.01)
*G06F 11/36* (2006.01)

(52) U.S. Cl.
CPC ................ *G06F 11/3684* (2013.01)
USPC ............ 717/124; 717/126; 717/129; 717/133

(58) Field of Classification Search
None
See application file for complete search history.

(56) References Cited

U.S. PATENT DOCUMENTS

| | | | | |
|---|---|---|---|---|
| 7,958,400 | B2 * | 6/2011 | Ur ................................. | 717/126 |
| 8,191,044 | B1 * | 5/2012 | Berlik et al. ................... | 717/124 |
| 8,276,123 | B1 * | 9/2012 | Deng et al. .................... | 717/125 |
| 8,739,128 | B1 * | 5/2014 | Cohen et al. ................... | 717/124 |
| 2005/0166094 | A1 * | 7/2005 | Blackwell et al. .............. | 714/38 |
| 2005/0204201 | A1 * | 9/2005 | Meenakshisundaram et al. ............................... | 714/38 |
| 2006/0168565 | A1 * | 7/2006 | Gamma et al. ................. | 717/122 |
| 2008/0256393 | A1 * | 10/2008 | Ur ................................. | 714/38 |
| 2009/0125891 | A1 * | 5/2009 | Garimella et al. ............. | 717/131 |
| 2011/0145788 | A1 * | 6/2011 | Xu et al. ........................ | 717/121 |
| 2011/0219359 | A1 * | 9/2011 | Gupta ............................ | 717/124 |
| 2012/0060144 | A1 * | 3/2012 | Novak et al. .................. | 717/105 |
| 2012/0253728 | A1 * | 10/2012 | Chamas et al. ............... | 702/109 |

* cited by examiner

*Primary Examiner* — Isaac T Tecklu
(74) *Attorney, Agent, or Firm* — Schwegman Lundberg & Woessner, P.A.

(57) ABSTRACT

Various embodiments include at least one or systems, methods, and software providing abilities to automatically generate a test plan that mitigates risk involved in testing less than an entirety of a software system following modification. Some embodiments operate to allow a user to influence the scope of an optimized test plan while also reducing a number of tests and test execution effort involved. Such embodiments may identify portions of the software system to test and portions of the software system that will not be tested in a manner that reduces a total testing effort involved. Reductions in testing effort are performed in generation of the test plan in view of testing preferences which are utilized not only to reduce the total effort in executing a test plan, but also does so to optimize the test plan.

18 Claims, 8 Drawing Sheets

SYSTEM TEST SCOPE AND PLAN OPTIMIZATION

BACKGROUND INFORMATION

Testing modern enterprise-class software systems, such as an Enterprise Resource Planning (ERP) system, following system modifications and prior to deployment generally involves lengthy and expensive efforts. The goals of such testing include ensuring the modifications function as intended and to confirm the modification did not introduce problems to other previously functional portions of the software system. To perform the testing, test plans are typically developed that include test cases to test each portion of the software system. However, sometimes, less than an entire software system may be tested, but this introduces unknown risk to the test plan and eventual deployment of the modifications.

DETAILED DESCRIPTION

Various embodiments illustrated and described herein provide abilities to automatically generate a test plan that mitigates risk involved in testing less than an entirety of a software system following modification. Some embodiments operate to allow a user to influence the scope of an optimized test plan while also reducing a number of tests and test execution effort involved. Such embodiments may identify portions of the software system to test and portions of the software system that will not be tested in a manner that reduces a total testing effort involved. Reductions in testing effort are performed in generation of the test plan in view of testing preferences which are utilized not only to reduce the total effort in executing a test plan, but also does so to optimize the test plan. The optimization, in different embodiments, may eliminate redundantly present test cases, including test cases of greater testing significance according to ranking algorithms, including test cases of the software system portions impacted by modification while excluding test cases of non-impacted processes, and also in view of additional testing preferences. These and other embodiments are described below with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules, components, or devices with related control and data signals communicated between and through the modules, or as portions of an application-specific integrated circuit. Thus, the exemplary process flow is applicable to software, firmware, and hardware implementations.

Certain embodiments are described herein as including logic or a number of mechanisms or components, also referred to as modules. A component is tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g. over appropriate circuits and buses) that connect the components. In embodiments where multiple components are configured or instantiated at different times, communications between such components may be achieved, for example, through the storage and retrieval of information in memory structures to which the multiple components have access. For example, one component may perform an operation, and store the output of that operation in a memory device to which it is communicatively coupled. A further component may then later access the memory device to retrieve and process the stored output. Components may also initiate communications with input or output devices, and can operate on a resource (e.g., a collection of information).

Figure 1:
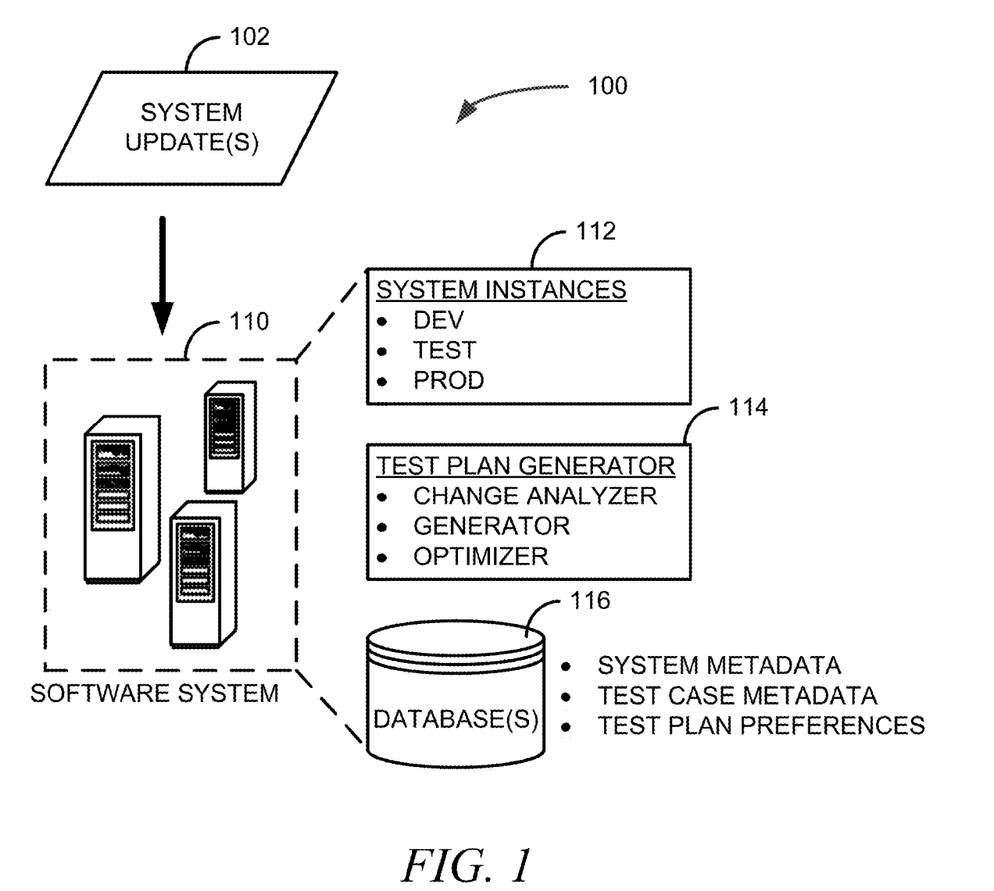
FIG. 1 is a logical block diagram of a system, according to an example embodiment.

FIG. 1 is a logical block diagram of a system 100, according to an example embodiment. The system 100 includes a software system 110 deployed on one or more servers that are accessible by client computing devices via a network to interact with the software system 110. The software system 110 may include multiple instances 112 of one or more applications. For example, the multiple instances 112 may include a development instance that is utilized by developers and administrators of the software system in performance of software development, proof of concept, prototyping, and other such development activities. The multiple instances 112 may also include a testing instance that may be utilized to perform testing of software system 110 modifications to ensure the changes operate properly prior to deployment to a production instance. The production instance of the multiple instances 112 is an instance of the software system 110 utilized by an organization in a live, productive transaction business environment. Although the multiple instances 112 are illustrated and described as being all within a single software system 110 deployment and computing environment, other embodiments may include more or less instances, deployment of the multiple instances 112 in different and multiple computing environments, among other variances depending on the particular embodiment.

The system 100 also includes at least one database 116. In many embodiments, multiple databases may be present. In addition, although only a single database 116 is illustrated, there may be multiple instances of the database 116, with a database 116 instance for each of the multiple instances 112 of the software system 110. The database 116 typically stores transactional data, master data, and other such data of the software system 110. The database 116 may also store software system 110 metadata and other documentary and configuration data, such as data identifying implemented software system 110 processes, components, content, user interfaces, communication interfaces, and the like. Additionally, the database 116 may store data representative of defined test cases in association with software system processes and components which they test. Further, the database 116 may store data representative of test plan preferences, generated test plans, and other test plan and test case related data.

The software system 110 includes a test plan generator 114. The test plan generator 114 may be a component of the software system 110, an add-on component, a separate application that may be installed and execute, in whole or in part, on a same computing device or in the same computing environment as the software system. In other embodiments, the test plan generator 114 may execute remotely from the software system 110 but communicates with the software system 110 or against software system 110 data, such as may be stored in one or more databases 116. In such embodiments where the test plan generator 114 executes remotely from the software system 110, the test plan generator 114 may include its own database 116.

The test plan generator 114 operates to generate a test plan in view of system update data 102 and test plan preferences. The system update data 102 is data representative of modifications from software system 110 updates, such as from custom modifications or additions, configuration changes, a service pack, a new software system 110 version, activation of previously unutilized software system 110 functionality or processes, and the like. The test plan preferences include data identifying parameters for use by the test plan generator 114 in selecting test cases to include in a test plan. Based on the system update data 102 and the test plan preferences, the test plan generator may consider a large number of test cases and assemble a subset therefrom to form a test plan meets the test plan preferences. The test plan generator 114, in some embodiments, may first provide a summary view of a test plan prior to full test plan generation. The summary view can be provided to a user along with abilities to make modifications to the test plan and to accept the test plan. The test plan may then be modified or generated by the test plan generator based on the user input.

As mentioned above, the system update data 102 is data representative of modifications from software system 110 updates, such as from custom modifications or additions, configuration changes, a service pack, a new software system 110 version, activation of previously unutilized software system 110 functionality or processes, and the like. The system update data 102 may be received or obtained in a number of different ways. One such way the system update data 102 may be received is with a service pack distributed by a software system 110 developer. In other embodiments, the system update data 102 may be received from or obtained by invoking a change analyzer program that operates to identify processes and components of the software system 110 impacted by the system update. A change analyzer program, such as the Business Process Change Analyzer available from SAP AG of Waldorf, Germany as a portion of the Solution Manager product, generally executes a set of test cases against the software system 110 while the software system 110 is in a trace mode. While in trace mode, the software system logs execution information such as processes and components that are called, what they are called by, and what they call. From this log data, processes and components either directly impacted by the system update or indirectly impacted (i.e., processes and components that call or are called by directly impacted processes or components) are identified.

Also as mentioned above, the test plan preferences include data identifying parameters for use by the test plan generator 114 in selecting test cases to include in a test plan. The test plan preferences, in some embodiments, are globally specified for all testing, or testing or particular portions of the software system 110. These test plan preferences may be specified by default with an installation of the test plan generator 114 or may be specified as one or more configuration settings by an administrator. In other embodiments, the test plan preferences may be specified by a user and stored. In some embodiments, different sets of test plan preferences may be specified, stored, and retrieved when needed. Thus, in various embodiments, the specification of test plan preferences may be adaptable to the requirements of the particular embodiment, policies that may be implemented by organizations utilizing the test plan generator 114, as may be deemed necessary by a user in implementing a particular software system 110 update, or to other needs.

The test plan preferences may include various preferences and may be linked or otherwise associated to different granular perspectives of the software system 110. For example, preferences may be associated in various embodiments to business processes, underlying code objects, branches of code within code objects, user interfaces, communication interfaces, data exchange interfaces or protocols, different services utilized or implemented within or otherwise accessed by the software system 110, particular content, and other granular perspectives. In some embodiments, these components at their particular granularities may include test plan preferences specifying categories of components that must be tested, preferred to be tested, can be tested, and not to be tested. For example, test plan preferences may be specified for particular business processes, such as a business process that defines an order fulfillment process from inventory, may have an associated test plan preference indicating the business process must be tested. The test plan generator 114, when generating a test plan then knows that it must include all test cases associated with that business process. Similarly, but in an excluding manner, a business process associated with a test plan preference specifying not to test will be utilized by the test plan generator 114 to exclude all test cases associated with that business process. When presented with test plan preferences of preferably be tested and can be tested, test cases of components that are preferably to be tested will be given preference over components that associated with a test plan preference of can be tested.

Other test plan preferences may indicate that only manually executed (by a human user) or automatically executed test cases be included or a preference for either one of manually or automatically executed test cases. In a case where a requirement is included in the test plan preferences for manually or automatically executed test cases, only such test cases will be selected for inclusion in the test plan and the test plan generator 114 will exclude all of the non-required manually or automatically executed test cases. When a test plan preference indicates that manually or automatically executed test cases are preferred, the test plan generator when considering test cases available for a particular software system 110 component identifies that both manually and automatically executed test cases are available, test cases that are non-compliant with the preference will be excluded and the preference-compliant test cases will be included.

A further test plan preference may specify a minimum or a maximum portion of the software system to test through the test plan generated by the test plan generator 114. For example, a test plan preference may specify that at least 80% of all processes or objects of the software system 110 be tested. In view of such a requirement, the test plan generator 114 in some embodiments will first add, to a test plan, test cases associated with test plan preferences indicating that certain business processes must be tested. At that point, the test plan generator 114 may then determine what portion of the software system 110 will be tested by the test plan. When the portion of the software system 110 to be tested does not yet reach a minimum-portion test plan preference, test cases associated with business processes that preferably be tested are added. Again, the portion of the software system to be tested will be measured and considered. If the portion of the software system 110 to be test by the test plan meets the specified minimum preference, the test plan is complete. However, if the specified minimum preference has not been met, additional test cases associated with business processes identified in the test plan preferences as need not be tested or can be tested are added until the specified minimum preference is met. Note that this is a simplified description of how test cases are selected by the test plan generator 114 for inclusion in a test plan. Further details of selection of test cases for inclusion in or exclusion from a test plan are discussed below with regard to other embodiments and other test plan preferences.

Figure 2:
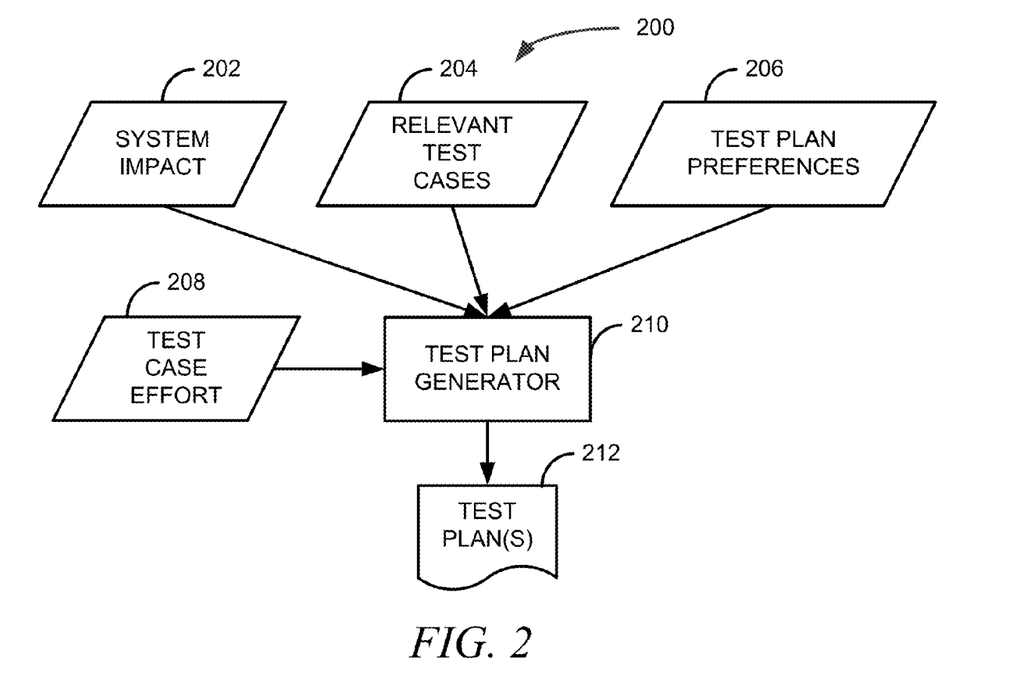
FIG. 2 is a logical block diagram of a system according to an example embodiment.

FIG. 2 is a logical block diagram of a system 200 according to an example embodiment. The system 200 includes a test plan generator 210, as similarly illustrated as test plan generator 114 in FIG. 1. The test plan generator 210 receives, retrieves, or otherwise obtains data to operate upon in generating and outputting one or more test plans 212.

The data the test plan generator 210 operates upon includes system impact data 202 that identifies components of a software system impacted by a system update or other modification. The system impact data 202 may identify system components at different granularities, such as business processes, objects, object code branches, database tables or fields, user interfaces, content, communication interfaces, and the like. In summary, the system impact data 202 represents what has been changed in the software system in a form that is relevant to the logic and other data within the test plan generator 210.

The data the test plan generator 210 operates upon further includes relevant test case data 204. The relevant test case data 204 includes data representative of test cases that test components of the software system that have been modified or are otherwise associated with the modified components (i.e., they call, are called by, or are otherwise involved in execution or performance of the impacted components). In some embodiments, the relevant test case data 204 may further include test cases associated with software system components indicated in test plan preference data 206 as must be tested.

The test plan preference data 206, as mentioned in the preceding paragraph and elsewhere-above, may include data identifying software system components that must be tested. The test plan preference data 206 may further include other classifying or categorizing data identify processes or other software system components that preferably be tested, need not be tested, and must not be tested. Additional test plan preferences may include priority data associated with particular software system components that may be used by the test plan generator 210 in determining a priority of software system components to include in or exclude from a test plan. Another test plan preference may identify a portion of a software system that must be tested or must be excluded from a test plan generated by the test plan generator 210. In some further embodiments, a test plan preference may specify a portion of a particular business process, object, or other software system component-type that must or must not be tested. For example, such preferences that identify portions to be tested or must not be tested may be based on a premise that when a certain portion of the software system is tested and found to pass the testing of a test plan, the risk associated with the untested portion of the software system being non-functional in some way is an acceptable risk. Thus, forbearance in testing such a portion is acceptable in view of the saved effort and expense from testing that portion of the software system or software system component.

Other test plan preference data 206 may identify a requirement of or preference for manually or automatically executed test cases. Additional test plan preferences may also be included in some embodiments, such as a preference for test cases authored by a particular user or department, preference for more recently authored or updated test cases, preference for test cases based on one or more particular data items specified by a user, and other preferences.

In some embodiments, the test plan generator 210 operates upon the system impact data 202 to identify processes and components that are impacted by modifications to the software. The test plan generator 210 may further identify processes and components based on the test plan preference data 206 that indicates certain software system processes and components must be tested. From this data, an initial scope of what will be tested by a test plan generated by the test plan generator is known. However, the scope of the test plan will be modified in view of the additional test plan preference data 206.

Based on the scope of the test plan, relevant test case data 204 is received, retrieved, or otherwise obtained by the test plan generator 210. Test cases represented in the relevant test case data 204 may be added as an associated business process or software system component is found in need of testing or excluded when an associated business process or software system component is found as not in need of testing. Thus, in various embodiments, the test plan generator 210 may operate in a manner that adds test cases to a test plan or instead, adds data representative of all test cases represented in the relevant test case data 204 to the test plan and then excludes, or removes, test cases when they are found to not be needed. However, other embodiments of the test plan generator 210 may include a combination of adding test cases and removing test cases from a test plan.

In some embodiments, when a test plan preference of the test plan preference data 206 indicates a requirement for only manually or automatically executed test cases, all non-compliant test cases may be removed from the data set of the relevant test case data 204. The test cases remaining in the relevant test case data may then be further considered. When the test plan preference data 206 includes categorizing data, such as data categorizing certain processes or other software system components as must be tested, preferably be tested, need not be tested, and must not be tested, the associated processes or other components may be categorized accordingly. The data of test cases represented in the relevant test case data 204 associated with processes or other components categorized as must be tested are added to the test plan. Test cases represented in the relevant test case data 204 associated with processes or other components categorized as must be not be tested are excluded from the test plan and may be removed from the data set of the relevant test case data 204. The remaining test cases in the relevant test case data 204 are then processed in view of the test plan preference data 206 to optimize the test plan generated by the test plan generator 210.

The optimizing performed by the test plan generator 210 generally operates to test a minimal amount of the software system while still ensuring adequate test coverage to provide assurance that a large enough portion has been tested in view of acceptable risk levels. The acceptable risk level may be specified and contemplated by the test plan generator 210 in the form of a certain portion of the software system that is the subject of the test plan. For example, a certain percentage of all system objects or processes being tested, a certain percentage of all system objects or processes impacted by the modification being tested, or some other measure. The way in which a portion of the software system tested is measured may be a test plan preference along with a particular percentage. In some other embodiments, a portion of the system tested may specify that all impacted processes or components be tested. Such a test plan preference may result in testing of a very small portion of the software system when the modifications are small. However, such a test plan preference may not be suitable when the modifications are numerous and impact a large amount of the system. Thus, as described above, flexibility is provided to users when utilizing the test plan generator 210 and reports may be provided to users prior to final test plan generation to ensure the output test plan 212 is acceptable. Examples of different user interface tools through which impacted components may be viewed, test plan preferences may be specified, and test plan information may be viewed are provided in FIG. 3, FIG. 4, and FIG. 5.

In some embodiments, when the test plan generator 210 has generated a test plan, additional data may be added to the test plan. For example, test case effort data 208 representative of effort involved in executing test cases included in the test plan may be retrieved or otherwise obtained and added by the test plan generator 210 to a representation of the test plan. The test case effort data 208 may include data representative of an estimate of a number of hours need to execute respective test cases, an estimated number of employees or other resources, qualifications or other skills of the employees or other resources, associated costs, and other such data. The test case effort data 208 may further include data representative of test case constraints, such as data identifying other test cases that cannot execute in parallel, test cases that must execute either previously or subsequently, and other such constraints. The test plan generator 210 may then process the test case effort data 208 to compile a summary of estimated effort to implement the generated test case. The compiled test case summary data may then be output via a user interface, such as the user interface illustrated in FIG. 5. Note that in some embodiments, the test plan generator 210 may generate multiple test plans 212 and compile and provide views of each test plan via such a user interface. The user interface in such embodiments may provide an option allowing the user to select one of the multiple test plans 212 for final test plan 212 generation.

Figure 3:
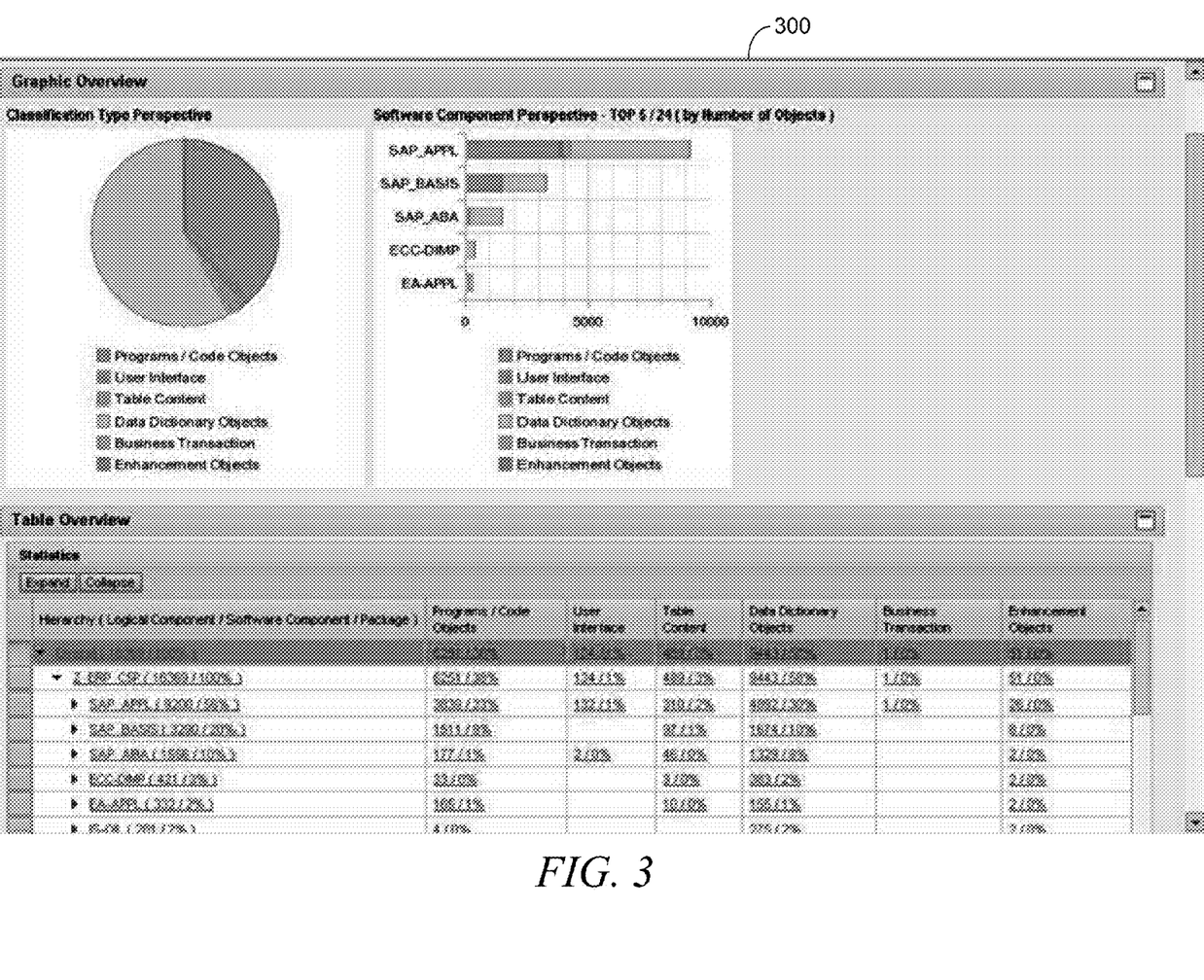
FIG. 3 is a user interface illustration, according to an example embodiment.

FIG. 3 is a user interface 300 illustration, according to an example embodiment. The user interface 300 is an example of a user interface that may be presented to a user to visualize data representative of system modifications. Examples of data representative of system modifications includes system update data 102 as illustrated and described above with regard to FIG. 1 or system impact data 202 illustrated and described above with regard to FIG. 2. The user interface 300, in particular provides different summary views of the data. The summaries as illustrated provide a summary of different classifications of components impacted by the modifications, different portions of the software system impacted by the modifications, and more detailed statistics in an expandable and contractible table. Other embodiments may provide more or less detail with regard to the included summaries. Further, some embodiments may include more summary presentations or fewer.

Figure 4:
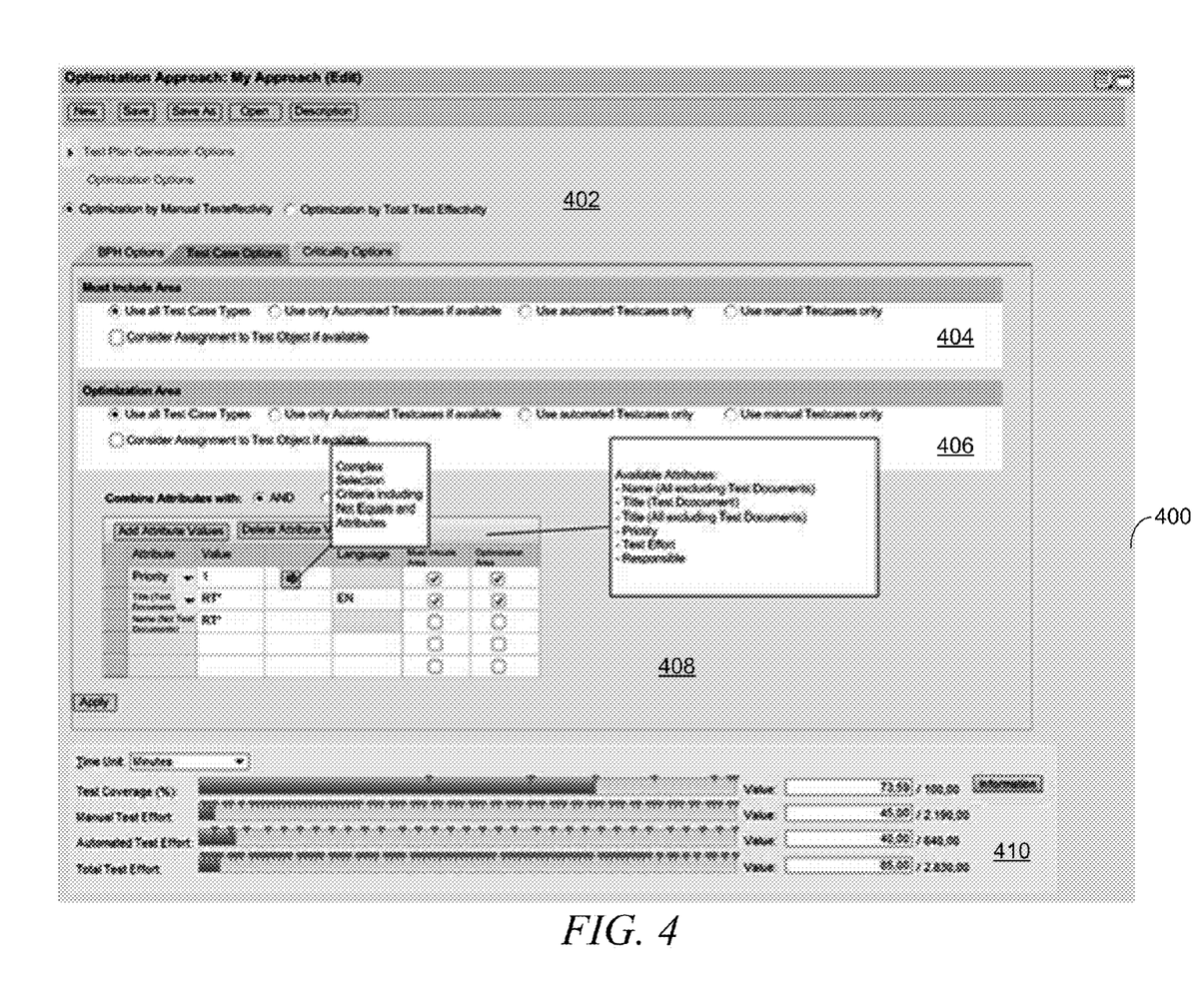
FIG. 4 is a user interface illustration, according to an example embodiment.

FIG. 4 is a user interface 400 illustration, according to an example embodiment. The user interface 400 is an example of a tool that may be used to specify test plan preferences, such as may be included in the test plan preference data 206 as illustrated and described above with regard to FIG. 2. The user interface 400, in some embodiments, may be utilized to set test plan preferences for a test plan as a whole, for individual software system components, or simultaneously for a plurality of software system components.

In some embodiments, the user interface 400 may be viewed in the context of a single software system component, such as a defined business process. However, in some other embodiments, another user interface or user interface control (not illustrated) may be used to select a plurality of software system components, such as two or more of business processes, objects, object code branches, user interfaces, communication interfaces, data translation services, and other software system components. Once the desired plurality of software system components have been selected, the user interface 400 may be presented to allow assignment of test plan preferences to the plurality of selected software system components.

The user interface 400 includes an optimization approach selection area 402 where options are provided for specifying an approach to be taken in optimizing a test plan. Different optimization approaches may be provided as options in different embodiments. As illustrated, there are two optimization approach options provided within the user interface 400. These optimization approaches may provide options as to how test effectivity is measured, such as measuring a portion of an entirety of the software system that is tested or measuring a portion of components impacted by software system modifications.

The user interface 400 further contains a "must include area" 404 and an "optimization area" 406. These areas 404, 406 provide options for assigning software system components to categories of whether certain components must be tested, preferably be tested, need not be tested, and must not be tested. Further, preferences and requirements for manually executed test cases or automatically executed test cases may be specified. Preferences and requirements for manually executed test cases or automatically executed test cases as illustrated may be assigned at the granularity of the categorization for the different software system components. For example, in the "must include area" 404, a preference for automated test cases if available may be assigned while in the optimization area, a requirement to use manual test cases only may be assigned.

The user interface 400 may further include an additional area 408 where additional test plan preferences may be provided. The additional area 408, in some embodiments, may provide options to identify software system components that need not be tested, to define more complex test plan preferences which may include rule specifications for how to identify software system components to test and which test case or test cases to utilize in testing the identified software system components, and which software system components and test cases to exclude from a test plan.

Some embodiments of the user interface may further include a test effort area 410. The test effort area 410 provides an estimate of an effort involved in executing a test plan according to the test plan preferences specified in the user interface 400. The test effort area 410 may provide different types of data, such as a test coverage percentage indicating what portion of the software system will be tested. The test coverage percentage, in some embodiments, may be calculated according to an optimization approach specified in the optimization approach selection area 402 of the user interface 400. A total test effort may also be provided in some embodiments as a measure of time such as in minutes, hours, days, weeks, and the like. Further detail can be provided with regard to the total effort involved, such as a representation of an amount of manual test case effort and an amount of automated test case effort. Other embodiments may include more, less, and different data. For example, one or more of cost information, personnel needed, computing resources needed, and other such information may be included. Additionally, the test effort data may be presented in different forms, such as the graphical form of FIG. 5.

Figure 5:
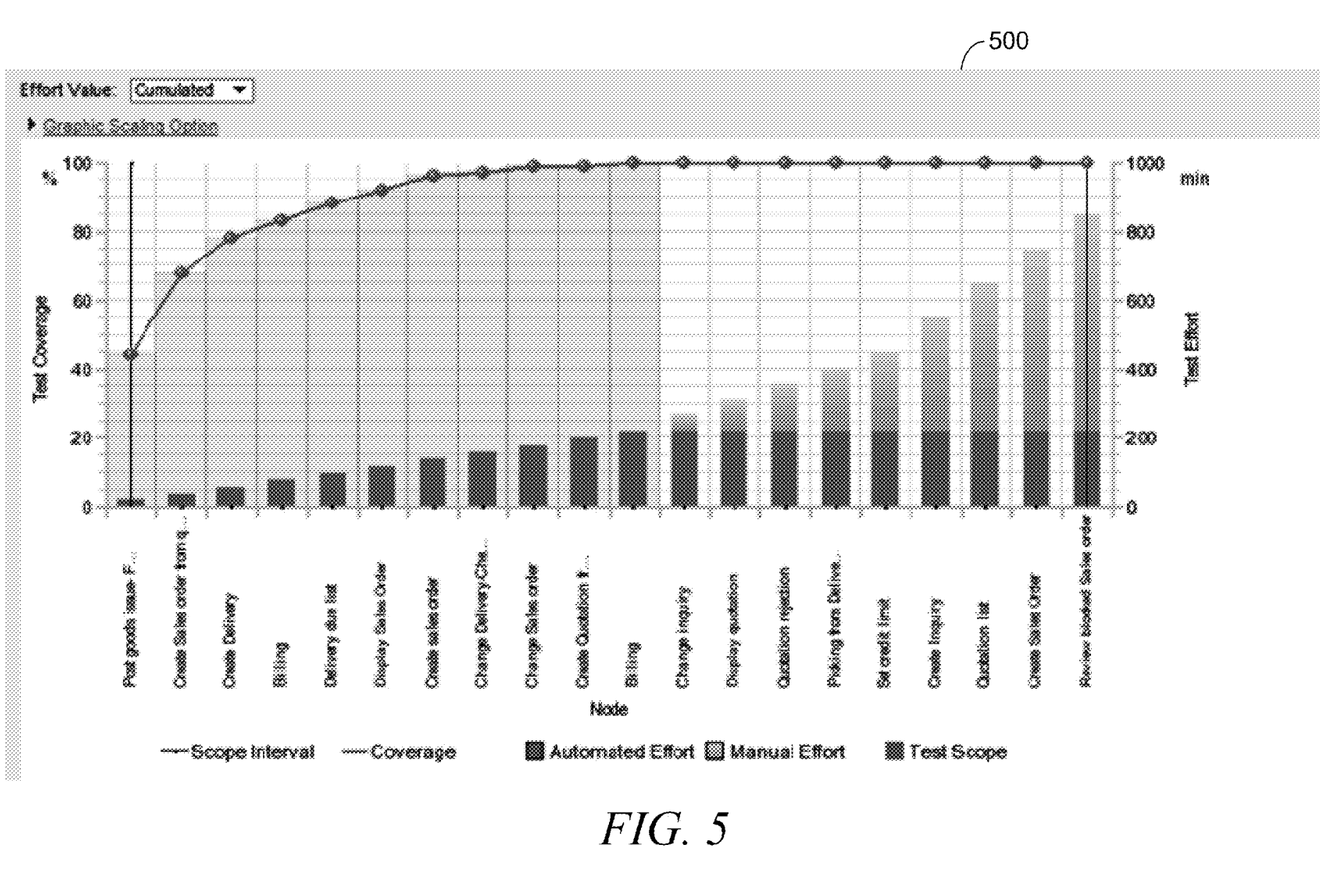
FIG. 5 is a user interface illustration, according to an example embodiment.

FIG. 5 is a user interface 500 illustration, according to an example embodiment. The user interface 500 illustration provides a graphical view of an amount of test effort involved in implementing a generated test plan. The same graphical view of the user interface 500 at the same time also provides a view of test coverage. The test effort and test coverage views are provided with regard to components of the software system. Such views as provided through the user interface 500 allow a user to determine if test coverage for different portions of the software system is sufficient in view of risk that might be involved. The test effort can also be considered to determine if the effort would be overly burdensome or expensive, not possible within a time prior to the modifications needing to be implemented in a production computing environment, and the like. In view of the data presented in the user interface 500, the user may choose to return to the user interface 400 of FIG. 4 or other user interface within which test plan preferences are input and modify the test plan preferences. Following modification to the test plan preferences, the user would likely return to the user interface 500 to determine if the changes resulted in test coverage and test effort changes that are now acceptable.

Figure 6:
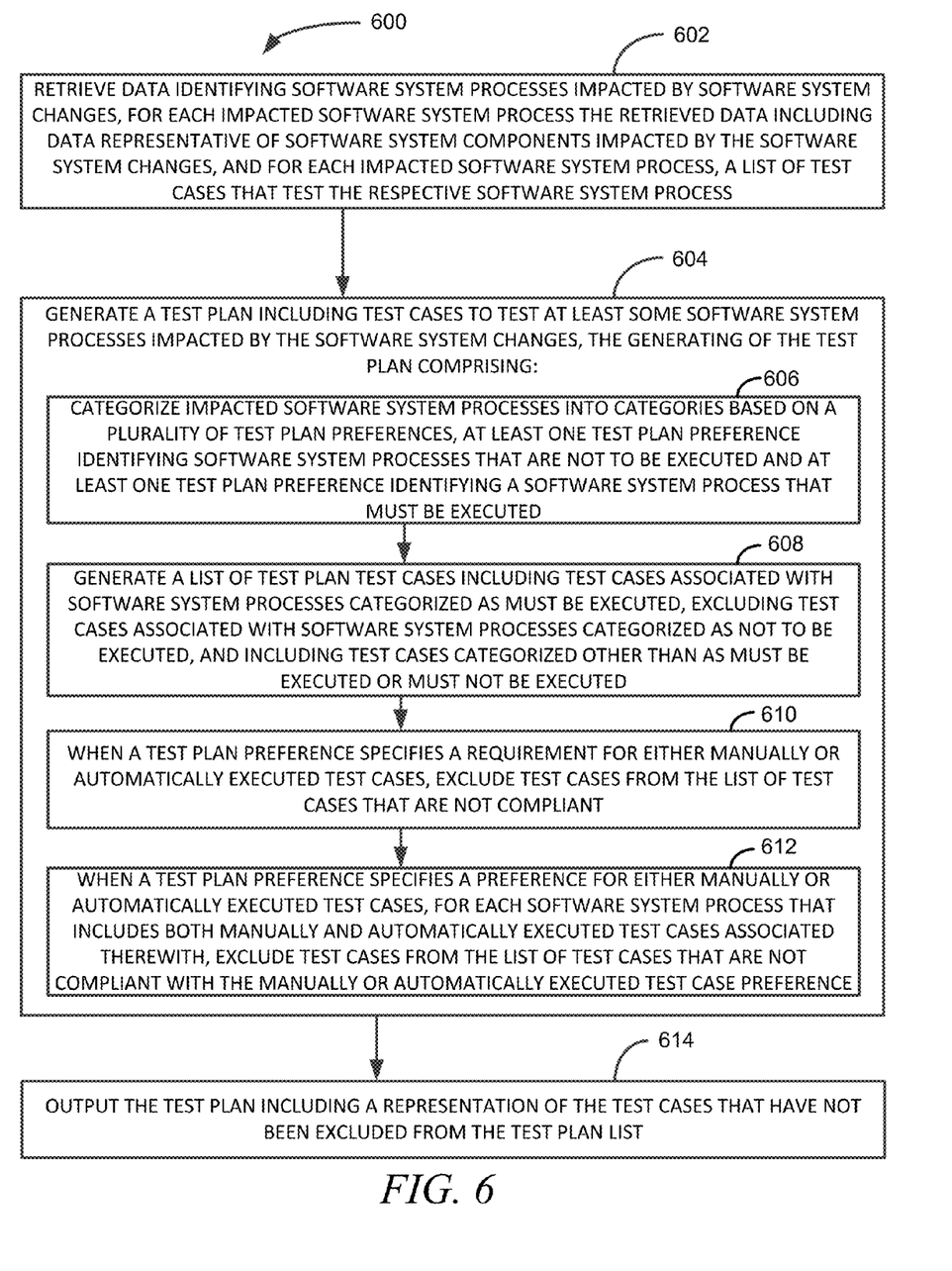
FIG. 6 is a block flow diagram of a method, according to an example embodiment.

FIG. 6 is a block flow diagram of a method 600, according to an example embodiment. The method 600 is an example of a method that may be performed to generate a test plan according to some embodiments. The method 600 includes retrieving 602 data identifying software system processes impacted by software system changes. The retrieved 602 data for each impacted software system process typically includes data representative of software system components impacted by the software system changes. The retrieved 602 data with regard to each impacted software system process may further include a list of test cases that test the respective software system processes.

The method 600 further includes generating 604 a test plan including test cases to test at least some software system processes impacted by the software system changes. In some embodiments, generating 604 a test plan is a multi-step process that involves categorizing 606 impacted software system processes into categories based on a plurality of test plan preferences. At least one of such test plan preference typically identifies software system processes that are not to be executed and at least one test plan preference typically identifies a software system process that must be executed. The method 600 may then generate 608 a list of test plan test cases including test cases associated with software system processes categorized as must be executed, excluding test cases associated with software system processes categorized as not to be executed, and including test cases associated with processes categorized other as than must be executed.

The method 600 also may include contemplation of test plan preferences that specify either requirements or preferences for either manually or automatically executed test cases. For example, in some embodiments, when a test plan preference specifies a requirement for either manually or automatically executed test cases, the method 600 excludes 610 test cases from the list of test cases that are not compliant. Similarly, when a test preference specifies a preference for either manually or automatically executed test cases, for each software system process that includes both manually and automatically executed test cases associated therewith, excluding 612 test cases from the list of test cases that are not compliant with the manually or automatically executed test case preference. The method 600 may then output 614 the test plan including a representation of the test cases that have not been excluded from the test plan list.

In some embodiments of the method 600, the test plan preferences include a plurality of test plan preferences. For example, the plurality of test plan preference may include a preference associated with at least one software system process indicating that the at least one software system process preferably be executed and a preference associated with at least one software system process indicating that the at least one software system process need not be executed. The plurality of test plan preferences may further include a test plan threshold identifying a portion of the software system to be tested. In such embodiments, generating 604 the test plan, when a determined portion of the software system to be tested by the test plan exceeds the test plan threshold and when the list of test cases includes test cases associated with software system processes categorized as need not be executed, the method 600 excludes test cases associated with software system processes categorized as need not be executed until the test plan threshold is met. Further, when the test plan threshold has not been met by excluding test cases associated with software system processes categorized as need not be executed, the method 600 may further exclude test cases associated with software system processes categorized as preferably be executed.

In some embodiments that exclude test cases associated with software system processes categorized as either need not be executed or preferably be executed may include ranking the software system processes of each respective category and excluding test cases starting with test cases associated with software system processes having a lowest ranking. Such ranking of software system processes categorized as either need not be executed or preferably be executed may include, for each category, ranking software system processes by a number of software system components involved in the respective software system process that are impacted by the software system changes. This ranking of software system processes further includes identifying the software system components involved in the highest ranked software system process that are impacted by the software system changes and removing the data representative of the identified software system components from the other software system processes in the respective category. The ranking processing in such embodiments is then repeated by performing the identifying and removing with regard to a next highest ranked software system process until all software system processes of the respective category have been ranked.

In some other embodiments, test cases categorized as either need not be executed or preferably be executed may be ranked differently. For example, the ranking may be performed to take into account a measure of test effectiveness, which may also be referred to as "test effectivity." Test effectivity, in some embodiments, is a calculation with regard to individual processes and the ranking is then performed based on the calculated test effectivity of the processes in the particular category. The test effectivity measure may be calculated based on a number of components associated with a process that are impacted by system modifications divided by a measure of effort involved in executing test cases associated with the process. The effort may be determined based on effort data retrieved from a test case database, or other data store, with regard to each process for which test effectivity is to be calculated.

In some embodiments, ranking based on test effectivity may proceed with regard to the processes of a category by calculating a test effectivity of each process. Calculating the test effectivity may be calculated in some embodiments by dividing a count of modified components associated with a process by test effort involved in executing test cases associated with the process. The processes may then be ranked according to the determined test effectivity of processes in the category. Next, the ranking process may identify the components involved in the highest ranked process and removing data representative of the identified components from the other processes. The ranking process in such embodiments then repeats, but without regard to previous highest ranked processes, until all processes have been ranked.

In some such embodiments that include ranking at least one of the test cases in the list of test cases may include a testing priority associated with at least one software system component tested by the respective test case. When a determined portion of the software system to be tested by the test plan exceeds the test plan threshold, and a plurality of test cases remain in the list of test cases that each test an overlapping set of software system components, the method 600, when at least one of the plurality of test cases is associated with a software system process categorized as must be executed, excludes all other test cases from the plurality of test cases leaving only test cases associated with software system processes categorized as must be executed. However, when none of the plurality of test cases are associated with software system processes categorized as must be executed and there is at least one test case of the plurality of test cases associated with a software system process categorized as preferably be executed, the method 600 may remove all other test cases from the plurality of test cases leaving only test cases associated with software system process categorized as preferably be executed. Further, when none of the plurality of test cases are associated with software system processes categorized as must be executed and there are a plurality of remaining test cases, the method 600 may choose a single test case from the plurality of test cases. The single test chosen will typically be a test case that complies with a test plan preference for either automatically or manually executed test cases when such a preference has been specified and at least one test case is compliant with the preference and includes a highest software system component testing priority amongst the plurality of remaining test cases.

Figure 7:
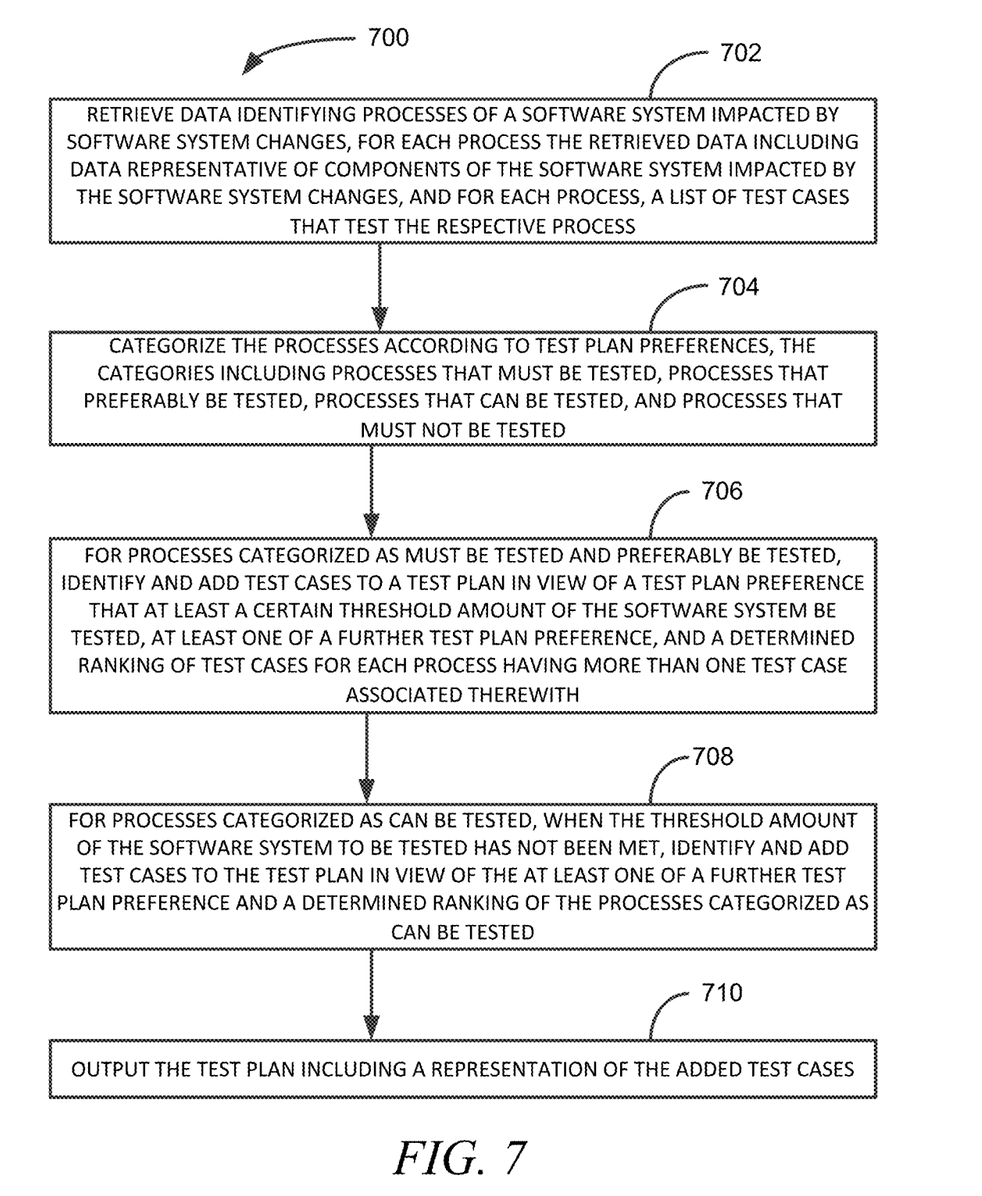
FIG. 7 is a block flow diagram of a method, according to an example embodiment.

FIG. 7 is a block flow diagram of a method 700, according to an example embodiment. The method 700 is another example of a method that may be performed to generate a test plan according to some embodiments. The method 700 includes retrieving 702 data identifying processes of a software system impacted by software system changes. The retrieved 702 data, for each process the retrieved includes data representative of components of the software system impacted by the software system changes. The retrieved 702 data for each process may further include a list of test cases that test the respective process. The method 700 then categorizes 704 the processes according to test plan preferences. The categories include processes that must be tested, processes that preferably be tested, processes that can be tested, and processes that must not be tested.

In some embodiments, for processes categorized as must be tested and preferably be tested, the method 700 includes identifying and adding 706 test cases to a test plan in view of a test plan preference that at least a certain threshold amount of the software system be tested, at least one of a further test plan preference, and a determined ranking of test cases for each process having more than one test case associated therewith. The method 700, for processes categorized as can be tested, when the threshold amount of the software system to be tested has not been met, further includes identifying and adding 708 test cases to the test plan in view of the at least one of a further test plan preference and a determined ranking of the processes categorized as can be tested. The method 700 may then output 710 the test plan including a representation of the added test cases.

In these and in some other embodiments herein, outputting 710 the test plan may include output a graphical summary of the test plan, such as may be presented in the user interfaces 400 and 500 of FIG. 4 and FIG. 5 as discussed above. In some embodiments, outputting 710 the test plan may include storing or transmitting a set of instructions executable by an automated software testing tool that are executable to perform a portion or an entirety of a test plan. Outputting 710 the test plan may further include storing or transmitting via a network a document identifying test cases to be executed as may be utilized by one or more users in performance of manual testing of the software system.

Figure 8:
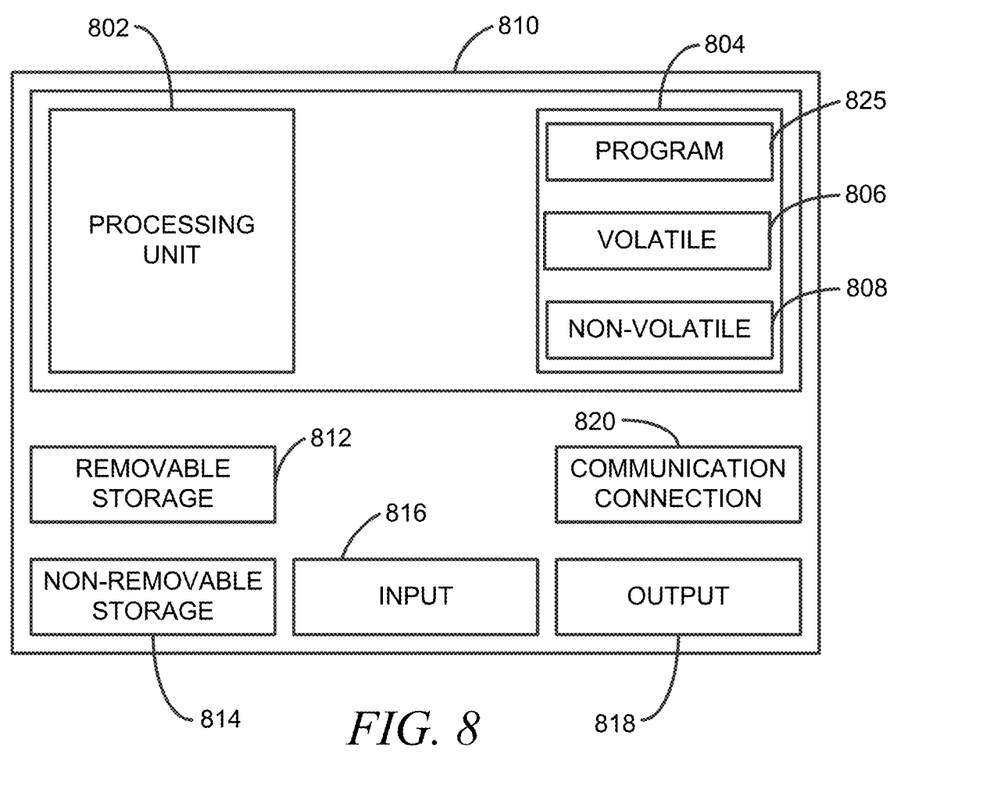
FIG. 8 is a block diagram of a computing device, according to an example embodiment.

FIG. 8 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 810, may include a processing unit 802, memory 804, removable storage 812, and non-removable storage 814. Memory 804 may include volatile memory 806 and non-volatile memory 808. Computer 810 may include—or have access to a computing environment that includes—a variety of non-transitory computer-readable media, such as volatile memory 806 and non-volatile memory 808, removable storage 812 and non-removable storage 814. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 810 may include or have access to a computing environment that includes input 816, output 818, and a communication connection 820. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 802 of the computer 810. A hard drive, CD-ROM, and RAM are some examples of articles including a non-transitory computer-readable medium. For example, a computer program 825 capable of performing one or more of the methods illustrated and described herein.

In another example embodiment, a process first executes to identify components of a software system impacted by modifications. Based on the identified components, a next process executes to generate a test plan including test cases to test various portions of the modified software system in view of testing preferences.

For example, a process to identify components of the software system impacted by modifications executes to generate a data set including data representative of system modifications. Examples of data representative of system modifications includes system update data 102 as illustrated and described above with regard to FIG. 1 or system impact data 202 illustrated and described above with regard to FIG. 2. An example of such a process that executes to identify components of the software system impacted by modifications may include placing the software system in a trace mode to cause the software system to generate a log identifying at least software system components and business processes that are executed and software system components and business processes that called each of the respective executed software system components and business processes. This process may further execute a change analysis plan against the software system while the software system is in the trace mode. A change analysis plan, in some embodiments, is a form of a general test plan tied to test cases, which may include one or both of manually and automatically executed test cases that execute an entirety of the software system or select portions based on input data identifying modified components of the software system.

The example method may further include processing the log generated from executing the change analysis plan. The processing of the log is performed in view of data identifying modified software system components and business processes to identify a set of software system components and business processes impacted by the modified software system components and business processes. In some embodiments, "impacted by the modified software system components and business processes" means the modified software system component or business process and any other component or business process that either calls or is called by the modified software system components or business processes. Based on the identified set of software system components and business processes and other data, such as the test plan preferences, a test plan may then be generated and output.

In some other embodiments, the identified set of software system components and business processes impacted by the modified software system components may be generated through file or data processing without requiring execution of the software system being modified. For example, data representative of system modifications may be received. The data representative of system modifications will typically identify modified software system components. In some embodiments, considerable documentation exists with regard to software systems that documents processes and components that utilize certain other components. This documentation along with the data representative of system modifications may be processed to identify the software system components and business processes impacted by the modified software system components and business processes.

Generation of the test plan in some embodiments may include retrieving data representative of test cases associated with each of the software system components and business processes represented in the identified set of software system components and business processes. The data representative of test cases is typically retrieved from a test case database, which may be a standalone database, a portion of a larger database, or other data storage mechanism or arrangement within which such data may be stored. The retrieved data representative of the test cases is then processed in view of the test plan preferences to reduce the number of test cases to include in the test plan. The processing of the retrieved data representative of the test cases in view of the test plan preferences, in some embodiments, includes removing test cases that test only software system components and business processes identified in the data representative of test plan preferences as not to be tested. Further, when a test plan preference specifies a requirement for either automated or manually executed test cases, all test cases contrary to the requirement are removed. Additionally, some embodiments, with regard to an individual test case included more than once in the retrieved data representative of test cases, include removing all but one instance of the respective test case.

In some embodiments, a test case represented in a test case database includes data associating the test case to a business process, data identifying at least one software system component tested by the test case, and data of a testing priority associated with at least one of the software system components tested by the test case. In at least one such embodiment, generation the test plan further includes additional processing for a set of test cases that each test a particular software system component. For example, such additional processing, when at least one of the test cases is associated with a business process indicated in the test plan preferences as a business process that must be tested, includes removing all other test cases leaving only test cases associated with business processes that must be tested. Further, when there are no test cases associated with a business process indicated in the test plan preferences as business processes that must be tested and there is at least one test case associated with a business process that is preferably to be tested, the additional processing includes removing all other test cases leaving only test cases associated with business process that are preferably to be tested. However, this additional processing to generate the test plan, when there are no test cases associated with a business process indicated in the test plan preferences as a business process that must be tested and there are a plurality of remaining test cases, includes choosing a single test case from the plurality of remaining test cases. That single test case may be a test case identified as complying with a test plan preference for either automated or human-user executed test cases when such a preference has been specified and at least one test case compliant with the preference. That single test case may further be identified as also including a higher software system component testing priority than other software system components associated with other test cases of the remaining set of test cases that each tests the particular software system component.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A non-transitory computer-readable storage medium, with instructions stored thereon which when executed by at least one processor cause a computer to perform data processing comprising:
    retrieving data identifying processes of a software system impacted by software system changes, for each process the retrieved data including data representative of components of the software system impacted by the software system changes, and for each process, a list of test cases that test the respective process;
    categorizing, the processes according to test plan preferences, the categories including processes that must be tested, processes that preferably be tested, processes that can be tested, and processes that must not be tested;
    for processes categorized as must be tested and preferably be tested, identifying and adding test cases to a test plan in view of a test plan preference that at least a certain threshold amount of the software system be tested, at least one of a further test plan preference, and a determined ranking of test cases for each process having more than one test case associated therewith;
    for processes categorized as can be tested, when the threshold amount of the software system to be tested has not been met, identifying and adding test cases to the test plan in view of the at least one of a further test plan preference and a determined ranking of the processes categorized as can be tested, the ranking of processes categorized as can be tested including:
        calculating a test effectivity of each process, the test effectivity calculated by dividing a count of modified components associated with a process by test effort involved in executing test cases associated with the process;
        ranking the processes according the determined test effectivity of processes in the category;
        identifying the components involved in the highest ranked process;
    removing the data representative of the identified components from the other processes; and
        repeating the calculating, ranking, identifying, and removing with regard to the processes except for previously highest rank processes until all processes have been ranked;
    retrieving effort data for each test case associated with a process categorized as can be tested, the effort data retrieved from a test case database that stores data representative of effort involved in executing respective test cases; and
    outputting the test plan including a representation of the added test cases and a representation of the determined effort involved in executing the test plan.

2. The non-transitory computer-readable storage medium of claim 1, wherein the at least one further test plan preference includes at least one of a requirement that test cases added to the test plan be one of either automatically or human executed test cases and a preference that test cases added to the test plan be one of either automatically or human executed test cases.

3. The non-transitory computer-readable storage medium of claim 1, further comprising:
    retrieving effort data for each test case added to the test plan, the effort data retrieved from a test case database that stores data representative of effort involved in executing respective test cases;
    determining an effort involved in executing the test plan based on the retrieved effort data; and
    wherein outputting the test plan includes outputting a representation of the determined effort involved in executing the test plan.

4. The non-transitory computer-readable storage medium of claim 1, wherein identifying and adding test cases for processes categorized as must be tested and preferably be tested when the threshold amount of the software system be tested has not been met includes adding all test cases associated with processes categorized as must be tested and adding test cases associated with highest ranked processes categorized as preferably be tested until the threshold amount of the software system to be tested is either met or test cases associated with processes categorized as preferably be tested have all been added.

5. The non-transitory computer-readable storage medium of claim 4, wherein identifying and adding test cases for processes categorized as can be tested when the threshold amount of the software system be tested has not been met includes adding test cases associated with highest ranked processes until the threshold amount of the software system to be tested is met.

6. The non-transitory computer-readable storage medium of claim 5, wherein identifying and adding test cases for processes categorized as either of preferably be tested and can be tested further includes, when a respective process includes more than one test case associated therewith prioritizing test cases associated with a respective process and identifying and adding the highest ranked test case of the highest ranked processes until the threshold amount of the software system to be tested is met.

7. A system comprising:
at least one processor and at least one memory device;
a test plan generator stored in the at least one memory device and executable by the at least one processor to:
retrieve data identifying processes of a software system impacted by software system changes, for each process the retrieved data including data representative of components of the software system impacted by the software system changes, and for each process, a list of test cases that test the respective process;
categorize the processes according to test plan preferences, the categories including processes that must be tested, processes that preferably be tested, processes that can be tested, and processes that must not be tested;
for processes categorized as must be tested and preferably be tested, identify and add test cases to a test plan in view of a test plan preference that at least a certain threshold amount of the software system be tested, at least one of a further test plan preference, and a determined ranking of test cases for each process having more than one test case associated therewith;
for processes categorized as can be tested, when the threshold amount of the software system to be tested has not been met, identify and add test cases to the test plan in view of the at least one of a further test plan preference and a determined ranking of the processes categorized as can be tested; and
retrieve effort data for each test case added to the test plan, the effort data retrieved from a test case database that stores data representative of effort involved in executing respective test cases;
determine an effort involved in executing the test plan based on the retrieved effort data; and
output the test plan including a representation of the added test eases and a representation of the determined effort involved in executing the test plan.

8. The system of claim 7, further comprising:
a test plan preference module stored in the at least one memory device and executable by the at least one processor to receive and store data representative of test plan preferences.

9. The system of claim 7, wherein the at least one further test plan preference includes at least one of a requirement that test cases added to the test plan be one of either automatically or human executed test cases and a preference that test cases added to the test plan be one of either automatically or human executed test cases.

10. The system of claim 7, wherein ranking processes categorized as can be tested includes:
ranking processes by a number of components impacted by the software system changes involved in the respective processes;
identifying the components involved in the highest ranked process that are impacted by the software system changes;
removing the data representative of the identified components from the other processes; and
repeating the ranking and performing the identifying and removing with regard to a next highest ranked process until all processes have been ranked.

11. The system of claim 10, wherein identifying and adding test cases for processes categorized as must be tested and preferably be tested when the threshold amount of the software system be tested has not been net includes adding all test cases associated with processes categorized as must be tested and adding test cases associated with highest ranked processes categorized as preferably be tested until the threshold amount of the software system to be tested is either met or test cases associated with processes categorized as preferably be tested have all been added.

12. A method comprising:
retrieving data identifying processes of a software system impacted by software system changes, for each process the retrieved data including data representative of components of the software system impacted by the software system changes, and for each process, a list of test cases that test the respective process;
categorizing the processes according to test plan preferences, the categories including processes that must be tested, processes that preferably be tested, processes that can be tested, and processes that must not be tested;
for processes categorized as must be tested and preferably be tested, identifying and adding test cases to a test plan in view of a test plan preference that at least a certain threshold amount of the software system be tested, at least one of a further test plan preference, and a determined ranking of test cases for each process having more than one test ease associated therewith;
for processes categorized as can be tested, when the threshold amount of the software system to be tested has not been met, identifying and adding test cases to the test plan in view of the at least one of a further test plan preference and a determined ranking of the processes categorized as can be tested;
retrieving effort data for each test case added to the test plan, the effort data retrieved from a test case database that stores data representative of effort involved in executing respective test cases;
determining an effort involved in executing the test plan based on the retrieved effort data; and
outputting the test plan including a representation of the added test cases and a representation of the determined effort involved in executing the test plan.

13. The method of claim 12, wherein the at least one further test plan preference includes at least one of a requirement that test cases added to the test plan be one of either automatically or human executed test cases and a preference that test cases added to the test plan be one of either automatically or human executed test cases.

14. The method of claim 12, further comprising:
retrieving effort data for each test case added to the test plan, the effort data retrieved from a test case database that stores data representative of effort involved in executing respective test cases;
determining an effort involved in executing the test plan based on the retrieved effort data; and
wherein outputting the test plan includes outputting a representation of the determined effort involved in executing the test plan.

15. The method of claim 12,
wherein ranking processes categorized as can be tested includes:
calculating a test effectivity of each process, the test effectivity calculated by dividing a count of modified components associated with a process by test effort involved in executing test cases associated with the process;

ranking the processes according to the determined test effectivity of processes in the category;

identifying the components involved in the highest ranked process;

removing the data representative of the identified components from the other processes; and repeating the calculating, ranking, identifying, and removing with regard to the processes except for previously highest rank processes until all processes have been ranked.

16. The method of claim 15, wherein identifying and adding test cases for processes categorized as must be tested and preferably be tested when the threshold amount of the software system be tested has not been met includes adding all test cases associated with processes categorized as must be tested and adding test cases associated with highest ranked processes categorized as preferably be tested until the threshold amount of the software system to be tested is either met or test cases associated with processes categorized as preferably be tested have all been added.

17. The method of claim 16, wherein identifying and adding test cases for processes categorized as can be tested when the threshold amount of the software system be tested has not been met includes adding test cases associated with highest ranked processes until the threshold amount of the software system to be tested is met.

18. The method of claim 17, wherein identifying and adding test cases for processes categorized as either of preferably be tested and can be tested further includes, when a respective process includes more than one test case associated therewith prioritizing test cases associated with a respective process and identifying and adding the highest ranked test case of the highest ranked processes until the threshold amount of the software system to be tested is met.

* * * * *